United States Patent [19]

Zarouni

[11] 4,028,494
[45] June 7, 1977

[54] ESCROW TELEPHONE COIN COLLECTION CIRCUIT AND METHOD

[75] Inventor: Alfred Zarouni, Middletown, N.J.

[73] Assignee: Bell Telephone Laboratories, Incorporated, Murray Hill, N.J.

[22] Filed: May 17, 1976

[21] Appl. No.: 687,291

[52] U.S. Cl. .............................. 179/6.3 R; 179/6.31
[51] Int. Cl.² ........................................ H04M 17/00
[58] Field of Search ................ 179/6.3 R, 6.31, 6.4, 179/6.5; 194/44

[56] References Cited

UNITED STATES PATENTS

| | | | |
|---|---|---|---|
| 2,867,689 | 1/1959 | Horn et al. | 179/6.3 R |
| 3,448,218 | 6/1969 | Long | 179/6.3 R |
| 3,646,575 | 2/1972 | Heirbaut et al. | 179/6.3 R |
| 3,711,657 | 1/1973 | Niioka et al. | 360/71 |
| 3,794,770 | 2/1974 | Tabiichi et al. | 179/6.3 R |
| 3,814,907 | 6/1974 | Edington et al. | 179/6.3 R |
| 3,870,866 | 3/1975 | Halpern | 179/6.3 R |
| 3,890,468 | 6/1975 | Burns et al. | 179/6.5 |

OTHER PUBLICATIONS

Electrical Communication, vol. 48, No. 3, 1973, "Coin Operated Telephones," G. Zeidler, pp. 260–268.
Proceedings of the 5th International Symposium on Human Factors in Telecommunications, Sept. 1970, London 21–25, Paper 4.3, H. Oden & K. Kuhnle.
National Telecommunications Conference, vol. 1, 1973, "Conference Record," A. Zaky, pp. 10D–1 to 10D–3.

Primary Examiner—Kathleen H. Claffy
Assistant Examiner—Gerald L. Brigance
Attorney, Agent, or Firm—Howard R. Popper

[57] ABSTRACT

The speech path in an escrow coin telephone system wherein coins may be deposited throughout the talking state is maintained free of potentially disruptive coin collection signals. After the serving switching office has calculated the rate for the particular call but prior to called party answer, it transmits a series of rate metering impulses to the station set. A pulse generator at the station set is then preset at a frequency corresponding to the calculated rate and allows the credit balance to be reduced after each unit interval. Logic is provided to collect the coin of highest denomination while the cell is in progress and to ensure a fair coin refund after hangup so that large denomination coins are not collected when smaller ones are available.

13 Claims, 2 Drawing Figures

ESCROW TELEPHONE COIN COLLECTION CIRCUIT AND METHOD

BACKGROUND OF THE INVENTION

This invention relates to pay telephone systems and in particular to coin telephone station sets wherein the customer may extend the call by depositing additional coins throughout the conversation period.

The prior art coin station arrangements generally fall into two broad categories. In the first of these categories the coin deposit interval is restricted to a designated period during the initiation of the call and at the end of an incremental charging period. If an initial coin deposit is required prior to called customer answer, this category operates in the prepay mode, whereas if deposit is required only after such answer, the system operates in the postpay mode. In either mode the calling customer should not deposit coins at any arbitrary time during the conversation since the coin operator cannot be informed that the customer has done so. The deposit-permissible indication, usually in the form of an announcement, that therefore must be provided at the end of the incremental charging period tends to be disruptive of the conversation and heretofore has been, at least to some customers, a source of unfortunate but, alas, irremediable annoyance.

The second of the aforementioned categories is one that has hitherto not seen significant usage in the United States. It employs a special type of coin station set which allows the calling customer to deposit coins throughout the call conversation. In prior art versions of this "escrow" type of coin station the rates for calls are calculated at the central office by translating the call signalling dial pulses sent by the calling customer. Rate analysis is conducted at the central office in accordance with various factors such as distance, time of day, etc. With the rate thus determined, the central office returns metering impulses, preferably uniformly spaced in time, to the station set to operate a coin collecting relay therein.

While the escrow coin station system allows for time independent coin deposits, it has the disadvantage that the metering pulses appearing on the loop during conversation manifest themselves to the conversing parties as annoying and disruptive audible clicks. To resolve this problem the prior art has resorted to transmission-improvement techniques that serve to attenuate this effect. For example, one arrangement provides a separate signalling path for the metering impulses by utilizing a phantom arrangement. Phantom signalling is described in *Communication Engineering* by W. L. Everitt, 1937, pages 315–317. Another prior art arrangement transmits the metering impulses at a high frequency within the voiceband frequency range thus rendering the clicks barely audible.

While these measures tend to eliminate the speech interruption problem, they require that a specialized and expensive transmission facility be dedicated, as well as the use of additional station set and central office equipment. In addition, neither prior art arrangement entirely eliminates speech interruption. Moreover, for the phantom arrangement to be effective in this regard, unless a near-identical match of the impedances at either end of the loop is maintained, isolation of the pulse-signal path will not be achieved. Similarly, the high frequency transmission arrangement would merely serve to attenuate clicks but not to eliminate them entirely. The possible alternate approach of moving the rate analysis function from the central office and relocating it at the station set also involves significant equipment additions which would entail even greater expense and would not allow for the reliable and timely updating of rate information.

If would therefore be advantageous to provide an arrangement and method for an escrow coin telephone circuit which retains the benefits of a centralized rate analysis arrangement based at the switching office while completely avoiding speech interruptions due to clicks that are generated when metering impulses are transmitted during the call.

SUMMARY OF THE INVENTION

The foregoing and other objects are achieved in accordance with my invention in one illustrative embodiment thereof in which an escrow coin station set employs a pulse counter to receive rate pulses transmitted from the central office prior to called customer answer. These pulses are transmitted after the central office rate analysis equipment has received dial pulses from the station set and has determined the appropriate rate for the call. This pulse series may be simply encoded so that, e.g., the total number of pulses transmitted is indicative of the frequency of charging to be employed.

When all of the rate pulses have been received at the station set, a rate indicator, preferably one of a group of relays each corresponding to the number of pulses transmitted, is operated. The rate indicator, in turn, presets a frequency adjustable periodic pulse generating circuit such as a variable astable multivibrator, to a particular pulsing frequency by switching an appropriate timing network into the multivibrator circuit. When the call is answered, a charging pulse is generated in the station set to reduce the coin credit balance by an amount equivalent to a predetermined basic coin denomination. The occurrence of called party answer also supplies power to the multivibrator and allows a series of uniformly-spaced coin-credit reduction pulses to be generated throughout the conversation from circuitry internal to the station set.

Since a variety of coin denominations are depositable by the customer, logic circuitry is provided to ensure an equitable arrangement for the collection of coins. In the preferred embodiment, pulse counters, logic gates and relay contacts are arranged so that during conversation the highest coin denominations are collected first and so that the highest possible denominations are refunded upon hangup. Mechanical sensors, operable whenever coins of a given denomination are deposited, are employed to ascertain the presence or absence of a coin in each of the denominations. The aforementioned logic circuitry utilizes this information to ensure that a coin from the highest possible denomination is collected. Thus, a degree of flexibility is achieved in that not every charge pulse generated at the multivibrator need result in the immediate collection of a coin. If no immediately collectable coins of the proper denomination are available, the credit balance is reduced accordingly and results in the collection of a higher denomination coin at a later point in the conversation. Upon completion of the conversation, the lowest denomination coin is collected and the remaining coins from all denominations are refunded.

Thus, in accordance with the principles of my invention, by efficiently storing rate information at the station set, speech continuity of the loop during conversation is maintained without any interruption whatsoever from metering impulses, without modification to the loop transmission facilities, and without removal of the rate analysis function from its desirable location at the central office.

BRIEF DESCRIPTION OF THE DRAWING

The foregoing and other objects of my invention may become more apparent from the ensuing description and drawing in which.

DETAILED DESCRIPTION

Figure 1:
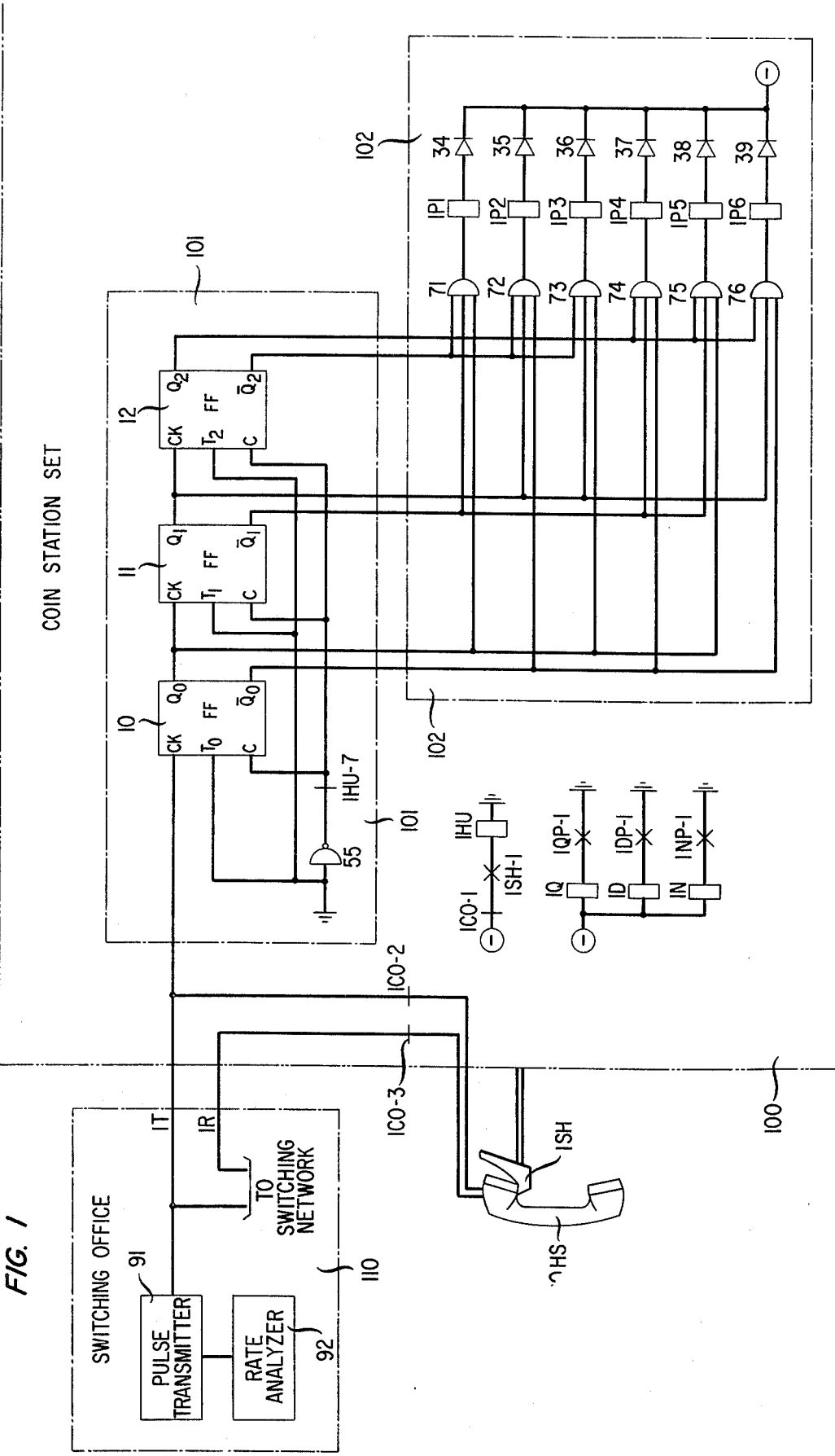
FIG. 1 schematically represents in outline form the relevant portions of a central switching office and, in greater detail, the pulse receiver logic circuitry at the coin station set.
Figure 2:
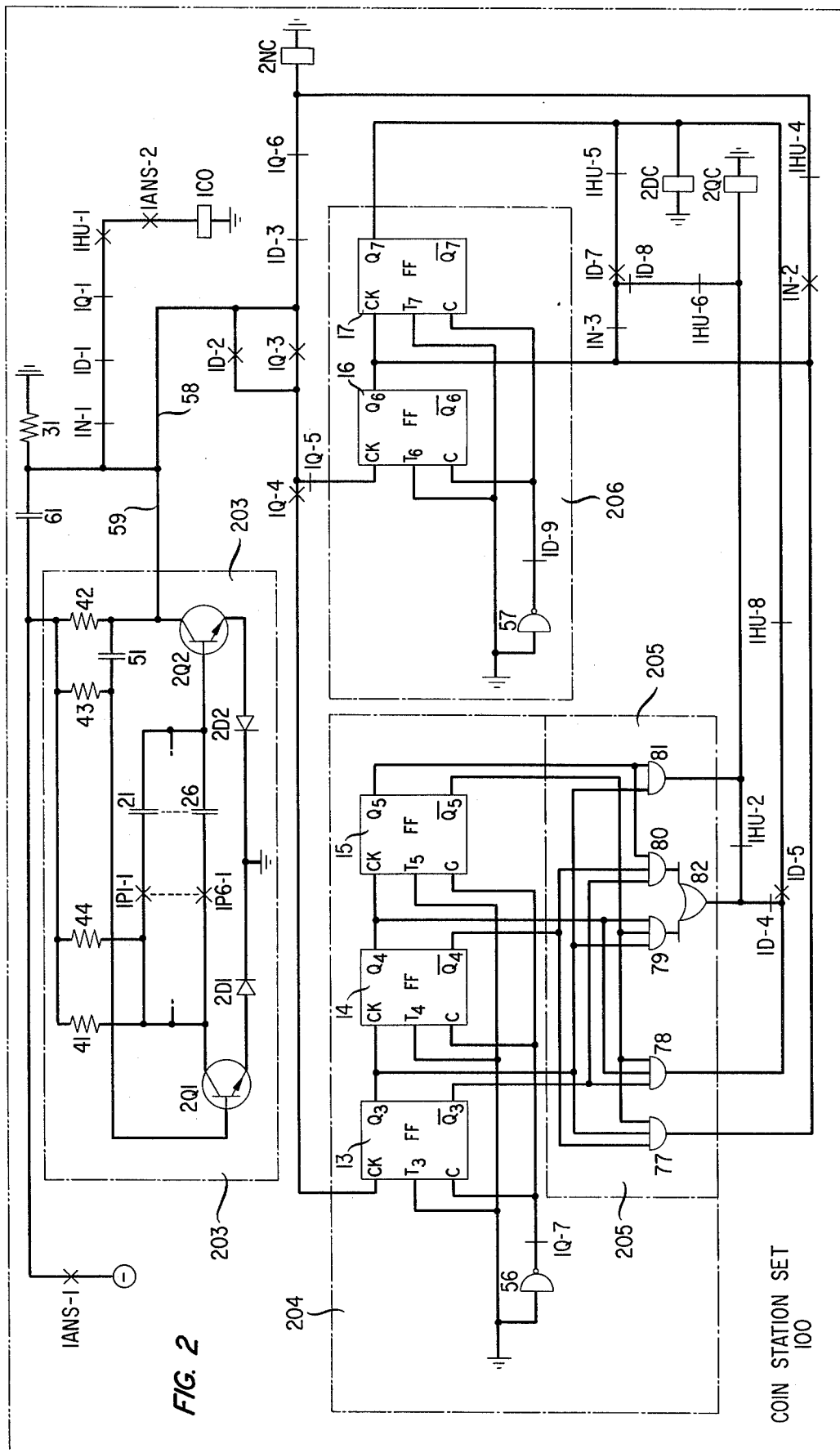
FIG. 2 schematically represents further portions of the station set including a variable multivibrator and coin collection logic circuitry.

FIGS. 1 and 2 with FIG. 1 arranged to the left of FIG. 2 depict one illustrative embodiment of my invention and specifically show relevant portions of switching office 110 and coin station set 100. At the completion of dialing by the customer using set 100, the call signalling information registered at central office 110 causes rate analyzer 92 to determine the particular charging frequency to be employed. Rate analyzer 92 does this in accordance with rate and routing information stored therein. An illustrative rate analyzer is shown in FIG. 4 of the article entitled "Automatization Coin Toll Calls and Upgrading the Coin Telephone Service of Single Slot Paystations", by A. Zaky, 1973 *National Telecommunications Conference*, Vol. 1, Conference Record pages 10D to 10D-3.

Assuming for illustrative purposes that there are six different possible rates, analyzer 92 will control pulse transmitter 91 to transmit a series of pulses ranging from one through six in number over tip lead 1T to station set 100. In accordance with an aspect of my invention, the pulses are advantageously transmitted from switching office 110 incident to the conventionally employed voice announcement, in which, prior to answer, the calling customer is instructed to make the initial deposit and is informed of the charging rate for the call. In this manner the pulses cannot interfere with subsequent voice transmission. The appropriate number of pulses are advantageously recorded as part of the same audio tape used for voice announcement. A typical voice announcement device is shown in FIG. 4 of the aformentioned Zaky article. Thus, pulse transmitter 91 in the illustrative embodiment includes a voice announcement tape having pulses recorded thereon for transmission to coin station set 100. Alternatively, pulse source 91 may utilize conventional circuitry for transmitting metered impulses from the switching office.

When handset 100HS is removed from switchhook 1SH, contact 1SH-1 closes and causes relay 1HU to operate. Prior to the operation of contact 1SH-1 and relay 1HU, it is assumed that counter 101 is reset. When relay 1HU operates, back contact 1HU-7 is opened causing the clear terminals C of flip-flops 10, 11 and 12 comprising counter 101 to be disconnected from the logic zero voltage level at the output of inverter 55. This prepares counter 101 to respond to signals from central office 110.

Decoder 102 is connected to monitor the Q and $\overline{Q}$ outputs of counter 101. When flip-flops 10, 11 and 12 receive the pulse count from pulse transmitter 91, at central office 110, the Q and $\overline{Q}$ outputs of these flip-flops are energized in a pattern to operate one of relays 1P1 through 1P6 via one of AND gates 71–76. In the following table, the pattern of flip-flop states and correspondingly operated relays is set forth.

TABLE I

| Q2 | Q1 | Q0 | Relay Operated |
|---|---|---|---|
| 0 | 0 | 0 | — |
| 0 | 0 | 1 | 1P1 |
| 0 | 1 | 0 | 1P2 |
| 0 | 1 | 1 | 1P3 |
| 1 | 0 | 0 | 1P4 |
| 1 | 0 | 1 | 1P5 |
| 1 | 1 | 0 | 1P6 |

The operate path includes the winding of the operated one of relays 1P1–1P6 and the corresponding one of diodes 34–39 to a negative potential.

Relays 1Q, 1D and 1N of station set 100 are provided to register the presence of a quarter, dime or nickel, respectively. These relays are operated by the closing of corresponding make contacts 1QP-1, 1DP-1 and 1NP-1. Each of the last-mentioned contacts is, in turn, independently closed by the operation of a coin presence detection circuit (not shown) for each of the possible denominations. A suitable coin hopper detection circuit is described in U.S. Pat. No. 2,867,689 issued to A. Horn, et al on Jan. 8, 1959.

Referring to FIG. 2, operation of one of the count-indicating relays 1P1 through 1P6 of FIG. 1 closes a corresponding one of make contacts 1P1-1 through 1P6-1 in variable miltivibrator circuit 203. Circuit 203 employs capacitively cross-coupled transistors 2Q1 and 2Q2, resistors 41 through 44 and diodes 2D1 and 2D2 to provide a pulse generating circuit having two quasi-stable states. A simple, fixed multivibrator is described in *Pulse Digital and Switching Waveforms* by J. Millman and H. Taub, 1965, pages 438–442. In my preferred embodiment, a modified astable multivibrator is employed wherein the pulse repetition rate may be varied. The pulse repetition rate of multivibrator 203 is determined by the operated one of contacts 1P1-1 through 1P6-1. The collector of transistor 2Q1 is coupled to the base of transistor 2Q2 via whichever one of capacitors 21 through 26 is selected by the operated one of count-indicating relay contacts 1P1-1 through 1P1-6.

When the called party, not shown, answers the call placed by the user of coin station set 100, contact 1ANS-1 shown to the left of multivibrator 203 is closed. The relay winding whose operation closes this contact and its operating path are not shown in the drawing since a similar "answer" relay is shown in FIG. 1 of U.S. Pat. No. 3,448,218 issued to G. F. Long on June 3, 1969, and is therefore well known. When contact 1ANS-1 is closed, operating battery is supplied across the differentiating network formed by capacitor 61 and resistor 31. As a result, immediately upon called party answer, a pulse spike is provided at lead 58 to the coin credit countdown logic comprising pulse counters 204 and 206. In addition, closure of contact 1ANS-1 supplies power to multivibrator 203 causing it to make periodic transitions between its two quasi-stable states.

Pulses thus periodically generated are processed at counter 204 and decoder logic circuit 205 and at counter 206. An output of the aforementioned logic and counter circuits is effective to operate an appropriate one of relays 2NC, 2DC and 2QC, which are shown at the right-hand side of FIG. 2. Operation of one of these relays, in turn, causes a nickel, dime or quarter, respectively, to be collected at the associated coin hopper (not shown) by closing a corresponding relay contact (not shown). Operation of coin-collect relays 2NC, 2DC and 2QC depends on the amount of coin credit outstanding at any given point in time and upon the distribution of of coins among the various allowable denominations.

As heretofore noted, the presence noted, the presence of a nickel, dime and quarter caused the respective operation of one or more of relay 1N, 1D and 1Q, FIG. 1. If only a nickel remains uncollected then an incoming pulse at lead 58 operates relay 2NC via break contacts 1D-3 and 1Q-6. When a dime is present and a quarter is not, a pulse is presented to pulse counter 206 via contacts 1D-2 and 1Q-5 without regard to the possible presence of a nickel. Assuming the ground in counter 206 to be at logic one, a logic zero at the output of inverter 57 is presented to clear inputs C of flip-flops 16 and 17 when relay not yet been operated. Upon detection of the dime, the resultant operation of relay 1D causes logic one clearing potential to be removed from flip-flops 16 and 17 due to contact 1D-9 and causes five cents of credit to be counted down at counter 206. If the calling customer should hang up before the next pulse arrives and in addition to the dime a nickel is also present, relay 2NC is operated via contacts 1N-2 and 1HU-4 due to the release of relay 1HU when the switchhook is replaced and contact 1SH-1 (FIG. 1) is opened. If no nickel is present, then, assuming that no quarter is present, relay 2DC is operated via contacts 1N-3, 1D-7 and 1HU-5. If customer hangup does not occur, then the next incoming credit reduction pulses causes counter 206 to advance, yielding an output at Q7 of flip-flop 17, thereby operating relay 2DC and collecting a dime.

The coin hopper (not shown) is designed so that contact 1DP-1 (FIG. 1) cannot close in response to detection of the next dime in the hopper until after relay 2DC has operated and the dime has been collected. Thus, prior to the sensing of the next dime, contact 1DP-1 remains open thereby releasing relay 1D and clearing counter 206 via contact 1D-9. The coin hopper design employing such a coin advance delay feature is described in the aforementioned Horn et al patent.

If a quarter is present, a pulse is presented to pulse counter 204 over contacts 1Q-3 and 1Q-4. Operation of relay 1Q at contact 1Q-7 removes clearing potential, provided at inverter 56, from the inputs C of flip-flops 13 through 15. Flip-flop 13 responds to the pulse appearing on lead 58 and yields an output at its terminal Q3. Decoder 205 contains AND gates 77–81 corresponding to a count of one through five, respectively, of counter 204. Thus, after one pulse is received at counter 204, gate 77 presents a high output.

If prior to the receipt of the next credit reduction pulse, customer hangup occurs and a nickel is present, release of relay 1HU operates relay 2DC via contacts 1N-2 and 1HU-4 and a nickel is collected. However, if no nickel is present, then the presence of a dime operates relay 2DC upon hangup over a path which includes contacts 1N-3, 1D-7 and 1HU-5. Relay 2DC operated then collects the dime at the coin hopper (not shown). When neither a nickel nor a dime is present, relay 2QC is operated via contacts 1N-3, 1D-8 and 1HU-6, and a quarter is collected.

If hangup does not occur prior to the next received pulse at counter 204, the count advances to two, causing the output of gate 78 to go high. Thereupon, if hangup should occur and a dime is present, relay 2DC is operated via contacts 1D-5 and 1HU-8 and a dime is collected. If no dime is present then relay 2QC is operated via contacts 1D-4 and 1HU-2.

Upon the appearance of the third and fourth pulses on lead 58, counter 204 applies a pattern of output signals to decoder 205 so that of gate 79 or gate 80, respectively, is high and so that the output of OR gate 82 is at logic one. Since the presence of three or four pulses represents a charge of 15 or 20 cents, respectively, the occurrence of hangup before a fifth pulse is received causes relay 2QC to be operated via contact 1HU-2, causing a quarter to be collected. Finally, if five pulses are received, gate 81 yields a high output and causes relay 2QC to operate and to collect a quarter. As heretofore described with respect to relay 1D, relay 1Q is released briefly even if other quarters are present in the coin hopper (not shown). Thus counter 204 has sufficient time to clear via inverter 56 and contact 1Q-7.

If at any time no coins of any denomination are present, i.e., relays 1Q 1D and 1N are released and the conversation is still in progress, slow-operate relay 1CO operates via contacts 1N-1, 1D-l, 1Q-1, 1HU-1 and 1ANS-2 causing the talking path on tip-and-ring leads 1T and 1R to be cut off due to break contacts 1CO-2 and 1CO-3 (FIG. 1). In addition, relay 1HU is released due to contact 1CO-1 which allows for the clearing of counter 101 by supplying logic zero clear potential at the output of inverter 55 via contact 1HU-7.

In sum, the number of pulses stored at counter 101, in accordance with a determination of the coin credit countdown pulse frequency supplied by rate analyzer 92 of switching office 110 prior to the start of the conversation, causes multivibrator 203 to generate pulses of predetermined frequency. Logic circuitry collects the largest coin denomination possible as the call progresses and refunds the maximum value in coins when the conversation is terminated.

Thus, I have shown an illustrative embodiment in which speech path interruptions due to rate metering impulses transmittable during conversation from a switching office are entirely eliminated. Moreover, my method and arrangement allow the cell rate analysis function to advantageously be retained at the central switching office and does not require modification of loop transmission facilities and related equipment.

It will be apparent to those of skill in the art that numerous modifications of the embodiment described herein may be made without departing from the spirit or scope of my invention. For example, the number of possible call rates need not be restricted to six. The addition of flip-flops to counter 101, of gates and relays to decoder 102 and of capacitors to multivibrator 203 allows any number of rate bands to be employed. Further and other modifications of the embodiment will be apparent to those of ordinary skill in the art.

What is claimed is:

1. A pay telephone station set arrangement comprising:
    means for controlling the storage of one or more deposited coins to establish a variable customer credit balance in accordance with the number and denomination of said deposited coins, means at said set operative at the inception of a call for receiving rate indicating signals, adjustable circuit means controlled by said receiving means for generating credit reduction signals throughout said cell at a frequency corresponding to said rate indicating signals, and logic circuit means for coupling said credit reduction signals to said controlling means to decrement said customer credit balance as said call progresses.

2. The invention in accordance with claim 1 wherein said adjustable circuit means comprises:

an astable multivibrator, and means for selectively connecting one of a plurality of timing circuits to said multivibrator.

3. The arrangement in accordance with claim 1 further comprising:

means responsive to the establishment of said call for reducing said coin credit balance by a predetermined initial charge.

4. The arrangement in accordance with claim 1 wherein said controlling means comprises:

means for initiating the collection of said deposited coins in the order of highest denomination as said call progresses and for initiating the collection of the coin of lowest applicable denomination when said call is terminated.

5. The arrangement in accordance with claim 2 further comprising:

means associated with each said coin denomination for indicating the presence of a deposited coin, pulse counting means associated with each said coin denomination for counting up to the value of a multiple of a predetermined base coin, means responsive to the operation of the highest denomination one of said indicating means for incrementing its associated counting means in response to a credit reduction signal, and means included in said controlling means responsive to a particular pulse counting means achieving its maximum count for collecting a coin of corresponding denomination.

6. The invention in accordance with claim 5 wherein said controlling means further comprises:

means responsive to the termination of said call for collecting the lowest denomination coin available having a multiple value of said base coin equal to the count in the activated one of said pulse counting means, and means responsive to said call termination for nevertheless collecting more than the amount owed when said coin of lowest available denomination is not sensed by said indicating means.

7. A pay telephone station comprising:

means responsive to a coin deposit for according the station user a predetermined credit, means for receiving call rate signals incident to the establishment of a call from said pay station, a source of coin credit countdown signals, means responsive to said receiving means for selecting a particular frequency of said coin credit countdown signals, and means for coupling said countdown signals to said credit-according means to reduce said predetermined credit throughout the duration of said call.

8. The invention in accordance with claim 7 further comprising:

means controlled by said countdown signals for periodically collecting said deposited coins in accordance with said particular frequency and the denomination of said deposited coins.

9. A method for collecting coins from a telephone station set wherein said coins are depositable at any time during call conversation and are effective to extend the duration thereof without interruption thereto comprising:

calculating the call rate at the switching office serving said station set in response to call establishment information receiving therefrom, transmitting rate indicating signals to said station set incident to the establishment of said conversation, generating at said station set periodic coin credit reduction signals at a frequency in accordance with said calculated call rate, and collecting in response to said credit reduction signals said deposited coins in the order of highest denomination while said conversation is in progress.

10. The method of claim 9 wherein said transmitting step is followed by the step of decoding said rate indicating signals incident to the establishment of said conversation to determine the frequency of coin credit reduction applicable to said conversation.

11. The method of claim 10 wherein said decoding step comprises:

selecting incident to the establishment of said conversation the one of a plurality of timing circuits for operation in said generating step that corresponds to said applicable frequency.

12. The method in accordance with claim 11 further comprising:

reducing said coin credit balance by an initial charge when said conversation is initiated.

13. The method in accordance with claim 12 further comprising:

refunding coins of higher denomination subsequent to the termination of said call conversation when coins of lower denomination are available for collection.

* * * * *